Feb. 16, 1943. A. L. AREY 2,311,506
VALVE STRUCTURE
Filed Dec. 22, 1941
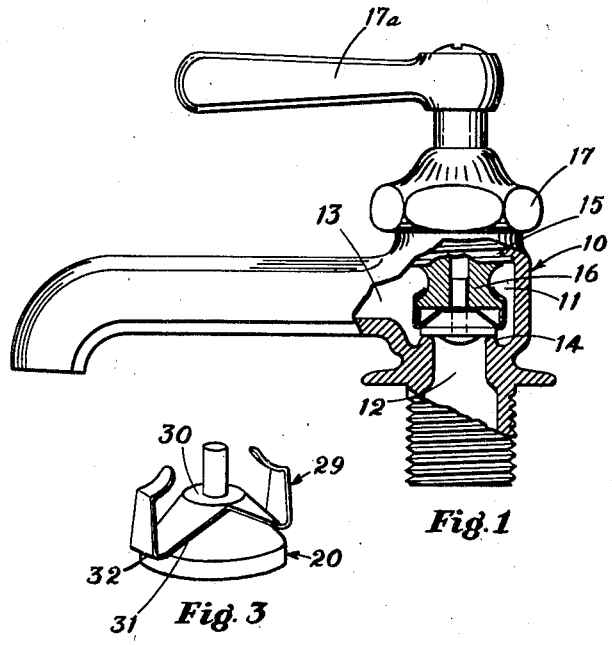
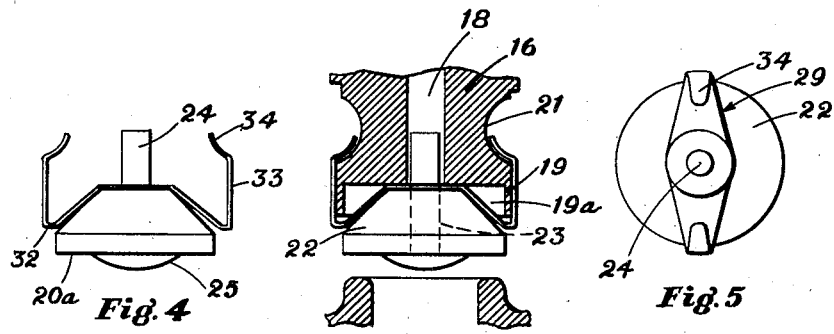
INVENTOR
Alton L. Arey
BY
Adrian Medert
ATTORNEY Patented Feb. 16, 1943

2,311,506

UNITED STATES PATENT OFFICE 2,311,506

VALVE STRUCTURE

Alton L. Arey, East Cleveland, Ohio

Application December 22, 1941, Serial No. 423,949

4 Claims. (Cl. 251—160)

This invention relates to valve structures and more particularly to a new and improved valve washer of the type commonly known as a "floating type washer," which may be attached to a valve stem without the use of screws or other similar attaching means.

It is among the objects of the present invention to provide a washer of the foregoing type, embodying resilient means for attaching the same to the end of a valve stem of a water faucet in such a manner as to be freely moveable relative thereto, so that the washer upon being brought into contact with the valve seat will remain stationary while the valve stem is further rotated to increase the pressure on the washer and effect a closing of the faucet, thereby eliminating excessive wear upon the washer.

It is a further object of the invention to provide a washer so contoured that when operatively assembled on the end of a valve stem and in engagement with a valve seat the face of the washer will be cushioned to thereby insure a liquid tight seal between the washer and the valve seat.

Another object of the invention is to provide in a valve structure a readily replaceable washer in which there is a limited surface contact between the washer and the lower end of the valve stem and wherein the washer is capable of free movement to effectively seat itself upon the valve seat independent of the means for holding the washer operatively positioned with respect to the valve stem.

A still further object of the invention is to provide a new and improved replacement washer which is relatively simple in construction and easily applied and which is economical to manufacture and efficient in use.

The foregoing objects and certain advantageous features of the invention will become more apparent from the following detailed description thereof taken in conjunction with the accompanying drawing wherein similar reference characters denote corresponding parts, and wherein:

Figure 1 is a side elevational view of a valve or faucet construction with parts thereof broken away and in section illustrating the valve arrangement of the present invention, Figure 2 is an enlarged fragmentary sectional detail illustrating the relationship between the valve stem carrying the washer and the valve seat, when the valve is open to permit passage of fluid therethrough, Figure 3 is a perspective view illustrating a valve washer constructed in accordance with the present invention, Figure 4 is a side elevational view of the washer of Figure 3, and Figure 5 is a top plan view of the washer.

With reference to Figure 1 of the accompanying drawing, the invention is illustrated as embodied in a valve or faucet generally indicated by the numeral 10 and including a valve chamber 11 having an inlet port 12 and an outlet port 13. Surrounding the inlet port 12 there is provided a raised valve seat 14 extending into the valve chamber 11. Mounted within the valve chamber 11, for rotatable and endwise movement on screw threads 15, is a valve stem 16 the shank of which extends upwardly through a cap 17 and is adapted to be rotated by means of a hand lever 17ª. As shown in Figure 2 the lower end of the valve stem 16 is provided with a depending peripheral flange 19 defining a chamber 19ª which preferably receives my improved washer construction 20. Extending inwardly from the chamber 19ª is an axial bore 18 and spaced from the lower end of the valve stem is a circumferential groove or recess 21.

The washer 20, which is a completely assembled unit preferably comprises a frusto-conical body portion 22, the lower surface 20ª of which is adapted to engage the valve seat 14. The body portion 22 is provided with an axial bore 23 receiving a centering pin 24 therethrough, one end of which is provided with an enlarged rounded head 25 projecting beyond the surface 20ª, the other end forming an extension projecting beyond the upper surface of the body portion and adapted to be received within the bore 18 of the valve stem 16 when assembled thereon. The extension of the pin 24 serves to center the washer with respect to the end of the valve stem preventing excessive lateral movement thereof, and the enlarged head 25 guides the surface 20ª into proper alignment with the valve seat as the valve is being closed.

Secured to the pin 24 adjacent the upper surface of the body portion 22 is a resilient clip member 29 which serves to operatively position the washer on the end of the valve stem.

The clip member 29 includes a circular base 30 which substantially covers the upper surface of the body portion of the washer and forms a metallic bearing surface between the washer and the end of the valve stem 16. Extending from the base 30 downwardly along the inclined side of the body portion 22 at diametrically opposed sides thereof, are wings 31 which extend beyond the body portion 22 and are reversely bent as at 32 to provide the substantially vertical extending projections 33, the extremities of which are bent inwardly to form gripping fingers 34. The distance between the projections 33 is substantially the diameter of the lower end of the valve stem to which the washer is to be attached.

In applying the washer 20 to the lower end of the valve stem the resilient wings 31 of the clip 29 are flexed outwardly to receive therebetween the lower end of the valve stem, the centering pin 24 is aligned with the axial bore 13 and moved thereinto and the fingers 34 are then snapped into the groove 21. The connection thus provided permits free movement between the washer and the end of the valve stem. As shown in Figure 2 there is substantial space within the chamber 19$^a$ in excess of that which is taken up by the washer 20 to permit a cushioning of the washer face 20$^a$ as the pressure is increased upon the washer by the valve stem in the closing of the valve.

As the valve is closed the rotating valve stem brings the washer into contact with the valve seat 14 where the friction therebetween prevents further rotation of the washer and permits the pressure exerted by the valve stem upon the washer to be increased without any deleterious effect upon the washer. It will be seen that the washer provided by the invention herein may be readily applied to a valve stem without any extended effort, and due to its inherent features is capable of long life and efficient operation.

It is to be understood that the invention herein shown and described is presented for purposes of illustration and explanation and that various modifications thereof may be made within the scope of the appended claims without departing from the spirit of the invention.

I claim:

1. A resilient valve washer with a valve seat engaging surface formed on the bottom thereof and having a centering pin projecting beyond the top surface of the washer arranged to be received within the axial bore of a valve stem, and resilient securing means for maintaining the washer operatively positioned with respect to the end of a valve stem, said means comprising resilient members secured to the top surface of the washer and said centering pin and adapted to extend along the side of the valve stem and having the extremities thereof inwardly bowed and adapted to be seated within a circumferential groove of the valve stem.

2. In a valve including a valve seat and a valve stem having an axial bore in one end and a circumferential groove adjacent thereto arranged to carry a washer on said end and move it into and out of engagement with said seat, a resilient valve washer therefore with a valve seat engaging surface formed on the bottom thereof and having a centering pin projecting beyond the top surface of the washer adapted to be received in the axial bore of the valve stem, and a plurality of resilient fingers secured to the top surface of the washer by said centering pin and adapted to receive therebetween the end of the valve stem, said fingers having the ends thereof inwardly turned and adapted to be seated within the circumferential groove of the valve stem.

3. In a valve including a seat and a valve stem having an axial bore in one end thereof and a circumferential groove adjacent thereto arranged to carry a washer on said end and move it into and out of engagement with said valve seat, a valve washer therefor comprising a frusto-conical resilient body portion with a valve seat engaging surface formed on the bottom thereof and having a centering pin adapted to be received in the axial bore of the valve stem, and a resilient clip, the ends of which are adapted to be seated within the groove of the valve stem for retaining said washer in operative relation with respect to the end of the valve stem said clip including members secured to the top surface of the washer by said centering pin and extending therefrom downwardly along opposite sides of the body portion to a point beyond the periphery of the body portion and then reversely bent in a direction parallel to the axis of the centering pin with the extremities thereof inwardly bent.

4. A valve washer comprising a frusto-conical body portion with a valve seat engaging surface formed on the bottom thereof, a centering pin extending through and beyond the upper surface of said body portion and arranged to be received within the axial bore of a valve stem, and resilient securing means fixed to the upper surface of the said body portion for maintaining the washer operatively positioned with respect to the end of a valve stem, said means comprising members extending from said pin downwardly along diametrically opposite sides of the body portion to a point beyond the periphery of the body portion and then reversely bent in a direction parallel to the axis of the centering pin with the extremities thereof inwardly bent and adapted to frictionally engage the exterior wall of a valve stem.

ALTON L. AREY.